United States Patent
Shimura (10) Patent No.: US 11,951,751 B2
(45) Date of Patent: Apr. 9, 2024

(54) INK JET INK SET FOR TEXTILE PRINTING, INK JET RECORDING METHOD, AND INK JET RECORDING APPARATUS

(71) Applicant: Seiko Epson Corporation, Tokyo (JP)

(72) Inventor: Kazuki Shimura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 35 days.

(21) Appl. No.: 17/358,088

(22) Filed: Jun. 25, 2021

(65) Prior Publication Data

US 2021/0402795 A1 Dec. 30, 2021

(30) Foreign Application Priority Data

Jun. 26, 2020 (JP) ................. 2020-110250

(51) Int. Cl.
*B41J 2/21* (2006.01)
*B41J 3/407* (2006.01)
*C09D 11/328* (2014.01)
*C09D 11/40* (2014.01)

(52) U.S. Cl.
CPC ........ *B41J 2/2107* (2013.01); *B41J 3/4078* (2013.01); *C09D 11/328* (2013.01); *C09D 11/40* (2013.01)

(58) Field of Classification Search
CPC ....... C09D 11/328; C09D 11/38; C09D 11/30; C09D 11/40; B41J 2/01; B41J 2/1752; B41J 2/17523; B41J 3/4078; D06P 5/004; D06P 5/30; D06P 5/006; G06K 15/1881; B41M 2205/02; B41M 5/0023
See application file for complete search history.

(56) References Cited

U.S. PATENT DOCUMENTS

| | | | | |
|---|---|---|---|---|
| 5,707,925 A | * | 1/1998 | Akada | ............... B41M 5/38257 503/227 |
| 6,398,352 B1 | * | 6/2002 | Morita | ................. B41J 2/17559 347/86 |
| 6,517,630 B1 | * | 2/2003 | Grandidier | .......... C09B 67/0001 546/28 |
| 7,959,725 B2 | * | 6/2011 | Yamamoto | ............. C09D 11/40 106/31.86 |
| 8,142,558 B2 | * | 3/2012 | Robertson | .............. C09D 11/36 106/31.86 |
| 8,263,682 B1 | * | 9/2012 | Papaiacovou | .......... C09D 11/36 523/160 |
| 8,709,103 B2 | * | 4/2014 | Oguchi | ................... D06P 5/004 8/445 |
| 9,751,333 B2 | * | 9/2017 | Ohnishi | .................... D06P 5/30 |
| 10,286,657 B2 | * | 5/2019 | Kameshima | ......... B41J 2/04505 |
| 11,035,075 B2 | * | 6/2021 | Doumaux | ............ C09D 11/324 |
| 11,098,214 B2 | * | 8/2021 | Shimoni | ............. C09D 11/033 |
| 11,447,648 B2 | * | 9/2022 | Ben-Zur | .................. D06P 5/30 |

(Continued)

FOREIGN PATENT DOCUMENTS

| | | |
|---|---|---|
| JP | 2000-343731 A | 12/2000 |
| JP | 2016-132756 A | 7/2016 |
| JP | 2017-020139 A | 1/2017 |

*Primary Examiner* — John Zimmermann
(74) *Attorney, Agent, or Firm* — Harness, Dickey & Pierce, P.L.C.

(57) ABSTRACT

An ink jet ink set for textile printing according to the present disclosure includes a cyan ink, a magenta ink, a yellow ink, a black ink, and one or more selected from a first ink, a second ink, and a third ink.

20 Claims, 4 Drawing Sheets

(56) References Cited

U.S. PATENT DOCUMENTS

| | | | |
|---|---|---|---|
| 2008/0070009 A1* | 3/2008 | Akatani | C09D 17/003 516/9 |
| 2009/0043028 A1* | 2/2009 | Matsuyama | B41J 2/17513 524/556 |
| 2011/0169901 A1* | 7/2011 | Pinto | D06P 1/5235 347/101 |
| 2012/0021192 A1* | 1/2012 | Mheidle | C09D 11/30 427/256 |
| 2014/0063148 A1* | 3/2014 | Iwamuro | B41J 2/1752 347/86 |
| 2014/0268241 A1* | 9/2014 | Kakutani | G06K 15/1881 358/3.06 |
| 2015/0116418 A1* | 4/2015 | Oura | D06P 1/48 524/207 |
| 2016/0208435 A1 | 7/2016 | Oguchi et al. | |

\* cited by examiner

INK JET INK SET FOR TEXTILE PRINTING, INK JET RECORDING METHOD, AND INK JET RECORDING APPARATUS

The present application is based on, and claims priority from JP Application Serial Number 2020-110250, filed Jun. 26, 2020, the disclosure of which is hereby incorporated by reference herein in its entirety.

BACKGROUND

1. Technical Field

The present disclosure relates to an ink jet ink set for textile printing, an ink jet recording method, and an ink jet recording apparatus.

2. Related Art

In recent years, textile printing on a fabric and the like is performed using an ink jet recording method. In the related art, a screen textile printing method, a roller textile printing method, or the like is used as a textile printing method for the fabric, and since it is advantageous to apply an ink jet recording method, various studies are considered from the viewpoint of high-mix low-volume productivity and immediate printability.

Various performances are also required for inks used for textile printing ink jet recording, and from the viewpoint of dyeing the fabric, performances that cannot be required with ordinary inks may be required. Therefore, there are many factors to consider in the ink jet ink and set thereof for textile printing.

For example, in a disperse dye ink containing a disperse dye, an ink set provided with a specific color ink is known in addition to the CMYK (cyan, magenta, yellow, and black) process color inks. For example, in JP-A-2017-20139, an ink set provided with each specific color ink of red, orange, green, blue, pink, and violet is disclosed, in addition to the process color ink for the purpose of reducing the amount of ink that lands on an image forming portion and suppressing image bleeding.

However, in an ink set disclosed in JP-A-2017-20139, when forming an image having relatively high lightness, although the amount of ink that landed on an image forming portion could be reduced as compared with the case where the process color ink was used, the effect of reducing the amount of liquid was not sufficient when forming a specific chromatic color image having low lightness. Therefore, it was difficult to form a chromatic color image having low lightness while reducing the adverse effect of a large amount of liquid of ink landing on the image forming portion.

SUMMARY

According to an aspect of the present disclosure, there is provided an ink jet ink set for textile printing including a cyan ink, a magenta ink, a yellow ink, a black ink, and one or more selected from a first ink, a second ink, and a third ink, in which all inks constituting the ink jet ink set for textile printing contain a sublimation dye, respectively, the first ink has, on a textile printed material after textile printing, a hue angle $\angle H°$ defined in a CIELAB color space in a range of 295° or more and 310° or less, and a lightness $L^*$ defined in a CIELAB color space in a range of 5 or more and 25 or less, the second ink has, on a textile printed material after textile printing, a hue angle $\angle H°$ defined in a CIELAB color space in a range of 130° or more and 180° or less, and a lightness $L^*$ defined in a CIELAB color space in a range of 15 or more and 30 or less, and the third ink has, on a textile printed material after textile printing, a hue angle $\angle H°$ defined in a CIELAB color space in a range of 0° or more and 45° or less, and a lightness $L^*$ defined in a CIELAB color space in a range of 15 or more and 30 or less.

According to another aspect of the present disclosure, there is provided an ink jet recording method including ejecting the ink jet ink set for textile printing of the above aspect by an ink jet method and performing recording on a recording target medium.

According to still another aspect of the present disclosure, there is provided an ink jet recording apparatus including an ink container each containing the ink constituting the ink jet ink set for textile printing of the above aspect, respectively.

DESCRIPTION OF EXEMPLARY EMBODIMENTS

Some embodiments of the present disclosure will be described below. The embodiments described below describe an example of the present disclosure. The present disclosure is not limited to the following embodiments, and includes various modifications implemented without changing the gist of the present disclosure. Not all of the configurations described below are essential configurations of the present disclosure.

1. Ink Jet Ink Set for Textile Printing

An ink jet ink set for textile printing according to the embodiment of the present disclosure (hereinafter, also simply referred to as "ink set") is used for recording on a recording target medium by an ink jet method.

The recording target medium is not particularly limited, and examples thereof include various fabrics. The material constituting the fabric is not particularly limited, examples thereof include natural fibers such as cotton, linen, wool, and silk, synthetic fibers such as polypropylene, polyester, acetate, triacetate, polyamide, and polyurethane, and biodegradable fibers such as polylactic acid, and these blended fibers may be used. As the fabric, the fibers listed above may be in any form such as a woven fabric, a knitted fabric, and a non-woven fabric. The fabric used in the present embodiment is more preferably formed of fibers containing polyester, acetate and the like. By using such a fabric, it is possible to obtain better dyeability of the ink jet ink for textile printing.

An ink jet ink set for textile printing according to the present embodiment includes a cyan ink, a magenta ink, a yellow ink, a black ink, and one or more selected from a first ink, a second ink, and a third ink, in which all inks constituting the ink jet ink set for textile printing contain a sublimation dye, respectively, the first ink has, on a textile printed material after textile printing, a hue angle ∠H° defined in a CIELAB color space in a range of 295° or more and 310° or less, and a lightness L* defined in a CIELAB color space in a range of 5 or more and 25 or less, the second ink has, on a textile printed material after textile printing, a hue angle ∠H° defined in a CIELAB color space in a range of 130° or more and 180° or less, and a lightness L* defined in a CIELAB color space in a range of 15 or more and 30 or less, and the third ink has, on a textile printed material after textile printing, a hue angle ∠H° defined in a CIELAB color space in a range of 0° or more and 45° or less, and a lightness L* defined in a CIELAB color space in a range of 15 or more and 30 or less.

That is, the ink jet ink set for textile printing according to the present embodiment is provided with one or more types of low-lightness inks having different colors in addition to the CMYK (cyan, magenta, yellow, and black) process color inks.

Since the ink jet ink set for textile printing according to the present embodiment is provided with one or more types of inks having low lightness and different colors, the amount of black ink used can be reduced when forming a chromatic color image having low lightness. Therefore, the ink set according to the present embodiment can reduce the amount of ink that lands on the image forming portion when forming a chromatic color image having low lightness, as compared with an ink set containing only the process color ink or an ink set provided with the specific color ink and the black ink in the related art.

Here, the CIELAB color space is an approximate uniform color space recommended by the International Commission on Illumination (Commission International de l'Eclairage: abbreviated as CIE) in 1976, which the Commission calls CIE1976 (L* a* b*).

In addition, the hue angle ∠H° is obtained by $\angle H°=\tan^{-1}(b^*/a^*)+180$ (when a*<0), or $\angle H°=\tan^{-1}(b^*/a^*)+360$ (when a*>0). a* and b* represent the perceptual chromaticity index defined in the CIELAB color space.

In the present disclosure, the hue angle ∠H° and lightness L* "defined in a CIELAB color space on the textile printed material after textile printing" are the hue angle ∠H° and the lightness L* measured from the color on the recording target medium textile printed by performing heat transfer for 30 to 120 seconds at a temperature of 180° C. to 210° C. by a dry heat method using a polyester fabric having a whiteness L* value of 85 to 95 as the recording target medium. More specifically, the hue angle and the lightness are numerical values measured by the following test method.

An ink jet printer (manufactured by Seiko Epson Corporation, trade name "PX-G930") is filled with ink to form an image on a transfer paper (manufactured by Sappi Co., Ltd., trade name "Transjet Sportsline"). Specifically, a fill pattern that can be recorded under the condition of the amount of ink injection of 12 mg/inch$^2$ at a resolution of 720 dpi in the horizontal direction and 720 dpi in the vertical direction and the amount of ink ejection of 100% duty is prepared and used.

Next, the recording surface of the transfer paper on which the image is formed faces the white polyester fabric (manufactured by Toray Co., Ltd., trade name "SS-755 K-1", whiteness L* value 85 to 95), and heat transfer is performed at a temperature of 180° C. to 210° C. for 30 to 120 seconds at a pressure of 4.2 N/cm$^3$ using a heat press machine (manufactured by Taiyo Seiki Co., Ltd., trade name "TP-608M").

The hue angle ∠H° and lightness L* are calculated from the a* value and b* value obtained from the obtained evaluation sample using a spectrophotometer (trade name "FD-7", manufactured by Konica Minolta Co., Ltd., measurement conditions: light source D65, filter D65, φ2 degrees). Similarly, the whiteness L* of the polyester fabric is measured using a spectrophotometer (trade name "FD-7", manufactured by Konica Minolta Co., Ltd., measurement conditions: light source D65, filter D65, φ2 degrees).

In the present disclosure, "low lightness" means that the lightness L* defined in a CIELAB color space on the textile printed material after textile printing is 30 or less.

In the present disclosure, "different colors" means that the hue angle L'H° defined in a CIELAB color space on the textile printed material after textile printing differs by 20° or more.

Hereinafter, the composition of each ink constituting the ink jet ink set for textile printing according to the present embodiment will be described.

1. 1. First Ink

The first ink constituting the ink jet ink set for textile printing according to the present embodiment is an ink having a hue angle L'H° defined in a CIELAB color space in the range of 295° or more and 310° or less and a lightness L* defined in a CIELAB color space in the range of 5 or more and 25 or less on the textile printed material after textile printing. The first ink is an ink exhibiting a so-called dark blue color.

1. 1. 1. Sublimation Dye

The first ink contains a sublimation dye. Examples of the sublimation dye contained in the first ink include C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, It is preferable to include one or more selected from C. I. Disperse Blue 72, C. I. Disperse Blue 359, C. I. Disperse Blue 360, C. I. Solvent Violet 13, and C. I. Disperse Violet 28 and one or more selected from C. I. Disperse Yellow 54, C. I. Disperse Yellow 232, C. I. Solvent Yellow 145, C. I. Disperse Orange 25, C. I. Solvent Orange 60, and C. I. Disperse Brown 27. As a result, colors having the hue angle ∠H° on the printed textile printed material in the range of 295° or more and 310° or less, and the lightness L* in the range of 5 or more and 25 or less can be reproduced with good quality.

The content of the sublimation dye is preferably 3% by mass or more, more preferably 4% by mass or more, and particularly preferably 5% by mass or more with respect to the entire first ink. The content of the sublimation dye is preferably 10% by mass or less, more preferably 9% by mass or less, and particularly preferably 8% by mass or less with respect to the entire first ink. When the content of the sublimation dye is within the above range, there is a tendency that the colors having the hue angle ∠H° on the printed textile printed material in the range of 295° or more and 310° or less, and the lightness L* in the range of 5 or more and 25 or less can be reproduced with good quality.

1. 1. 2. Dispersant

The first ink preferably contains a dispersant for the purpose of further improving the dispersion stability of the sublimation dye, improving the storage stability of the ink, the long-term ejection stability, and the like. Examples of the dispersant include an anionic dispersant, a nonionic dispersant, and a polymer dispersant. Among these, the first ink preferably contains the anionic dispersant. By using the anionic dispersant, the storage stability tends to be further improved, and the dyeing efficiency when the fabric is used as the recording target medium tends to be further improved.

The anionic dispersant is not particularly limited, and examples thereof include a naphthalene sulfonic acid condensate and a lignin sulfonate. In the present embodiment, it is assumed that the "naphthalene sulfonic acid condensate" contains a salt of the naphthalene sulfonic acid condensate. The naphthalene sulfonic acid condensate is not particularly limited, and examples thereof include a formalin condensate of alkylnaphthalene sulfonic acid such as β-naphthol sulfonic acid, methyl naphthalene sulfonic acid, butyl naphthalene sulfonic acid; a formalin condensate of β-naphthalene sulfonic acid, β-naphthol sulfonic acid; a formalin condensate of cresol sulfonic acid and 2-naphthol-6-sulfonic acid; and salts thereof.

The anion capable of forming a salt with the naphthalene sulfonic acid condensate and the lignin sulfonate is not particularly limited, and examples thereof include alkali metals such as lithium, sodium, and potassium; and alkaline earth metals such as magnesium and calcium. Among these, sodium is preferable. By using such a salt, the dispersion stability tends to be further improved.

The nonionic dispersant is not particularly limited, and examples thereof include an ethylene oxide adduct of phytosterol and an ethylene oxide adduct of cholestanol.

The polymer dispersant is not particularly limited, and examples thereof include polyacrylic acid partial alkyl ester, polyalkylene polyamine, polyacrylic acid salt, styrene-acrylic acid copolymer, vinylnaphthalene-maleic acid copolymer, and the like.

Among these dispersants, the first ink more preferably contains a naphthalene sulfonic acid condensate or sodium lignin sulfonate. By using such a dispersant, the dispersion stability tends to be more excellent, and the dyeing efficiency when a fabric is used as a recording target medium tends to be more excellent.

The dispersant may be used alone or in combination of two or more.

The content of the dispersant is preferably 50 parts by mass or more and 150 parts by mass or less, and more preferably 75 parts by mass or more and 125 parts by mass or less with respect to 100 parts by mass of the sublimation dye contained in the first ink. When the content of the dispersant is within the above range, the dispersion stability of the sublimation dye tends to be further improved.

1. 1. 3. Surfactant

The first ink preferably contains a surfactant for the purpose of adjusting the permeability and wettability of the first ink and suppressing the bleeding of the textile printed material. Examples of the surfactant include an acetylene glycol-based surfactant, an anionic surfactant, and a silicon-based surfactant.

The acetylene glycol-based surfactant is not particularly limited, and for example, one or more selected from an alkylene oxide adduct of 2,4,7,9-tetramethyl-5-decine-4,7-diol and 2,4,7,9-tetramethyl-5-decine-4,7-diol, and an alkylene oxide adduct of 2,4-dimethyl-5-decine-4-ol and 2,4-dimethyl-5-decine-4-ol are preferable. Commercially available products of acetylene glycol-based surfactants are not particularly limited, and examples thereof include E series such as Orfin 104 series and Orfin E1010 (trade name, manufactured by Air Products Japan, Inc.), Surfinol 465 and Surfinol 61 (trade name, manufactured by Nissin Chemical Industry Co., Ltd.), and the like.

The anionic surfactant is not particularly limited, and examples thereof include alkyl sulfocarboxylate, alkyl diphenyl ether disulfonate, α-olefin sulfonate, polyoxyethylene alkyl ether acetate, N-acylamino acid and salts thereof, N-acylmethyl taurine salt, alkyl sulfate polyoxyalkyl ether sulfate, alkyl sulfate polyoxyethylene alkyl ether phosphate, rosin acid soap, castor oil sulfate, lauryl alcohol sulfate ester, alkylphenol type phosphate, alkyl type phosphate ester, alkylaryl sulfonate, diethyl sulfo sulphate, diethyl hexyl sulfo sulphate, dioctyl sulfo sulphate, and the like. Commercially available products of anionic surfactants are not particularly limited, and examples thereof include Perex SS-H and Perex SS-L (trade names, manufactured by Kao Corporation).

Examples of the silicon-based surfactant include a polysiloxane-based compound and a polyether-modified organosiloxane. The commercially available silicon-based surfactant is not particularly limited, and specifically, examples thereof include BYK-306, BYK-307, BYK-333, BYK-341, BYK-345, BYK-346, BYK-347, BYK-348, and BYK-349 (hereinbefore, trade name, manufactured by Big Chemie Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hereinbefore, trade name, manufactured by Shin-Etsu Chemical Co., Ltd.), and the like.

The surfactant may be used alone or in combination of two or more.

Among these surfactants, it is more preferable that the first ink contains one or more selected from an acetylene glycol-based surfactant and a silicon-based surfactant. By using such a surfactant, the permeability and wettability of the first ink can be adjusted more appropriately, and the bleeding of the textile printed material can be further suppressed.

The content of the surfactant is preferably 0.1% by mass or more, more preferably 0.3% by mass or more, and particularly preferably 0.5% by mass or more with respect to the entire first ink. The content of the surfactant is preferably 2.0% by mass or less, more preferably 1.5% by mass or less, and particularly preferably 1.0% by mass or less with respect to the entire first ink. When the content of the surfactant is within the above range, the permeability and wettability of the first ink can be adjusted more appropriately, and the bleeding of the textile printed material can be further suppressed.

1. 1. 4. Water-Soluble Organic Solvent

The first ink preferably contains a water-soluble organic solvent. By containing the water-soluble organic solvent, it may be possible to improve the permeability of the first ink and suppress the bleeding of the textile printed material while effectively suppressing the evaporation of water from the ink jet head when left for a long period of time.

The water-soluble organic solvent is not particularly limited, and examples thereof include glycols of ethylene glycol, diethylene glycol, triethylene glycol, polyethylene glycol, propylene glycol, dipropylene glycol, tripropylene glycol, polypropylene glycol, propanediol, butanediol, pentanediol, hexylene glycol; lower alkyl ethers of glycols of ethylene glycol monomethyl ether, diethylene glycol monomethyl ether, diethylene glycol monoethyl ether, diethylene glycol monobutyl ether, triethylene glycol monomethyl ether; glycerin, 2-pyrrolidone, N-methylpyrrolidone, and the like. Among these, it is preferable to contain one or more selected from the group consisting of glycerin and glycols. As a result, there is a tendency to further suppress the bleeding of the textile printed material.

The water-soluble organic solvent may be used alone or in combination of two or more.

The content of the water-soluble organic solvent is preferably 20% by mass or more and 30% by mass or less with respect to the entire first ink.

1. 1. 5. Other Components

The first ink may contain additives other than the above components. Examples of such additives are illustrated below.

Water

The first ink may contain water. Examples of water include pure water such as ion-exchanged water, ultrafiltered water, reverse osmosis water, and distilled water, and water from which ionic impurities are removed as much as possible, such as ultrapure water. In particular, when water sterilized by ultraviolet irradiation or addition of hydrogen peroxide is used, it is possible to prevent the growth of mold and bacteria when the ink is stored for a long period of time. As a result, storage stability tends to further improve.

Preservative, Fungicide

The first ink may contain a preservative and a fungicide. Examples of preservatives and fungicides include sodium benzoate, sodium pentachlorophenol, sodium 2-pyridinethiol-1-oxide, sodium sorbate, sodium dehydroacetate, and 1,2-dibenzoisothiazolin-3-one (Proxel CRL, Proxel BDN, Proxel GXL, Proxel XL. 2, Proxel TN, Proxel LV of Zeneca plc), 4-chloro-3-methylphenol (Priventol CMK of Bayer AG), and the like.

Others

Furthermore, as components other than the above, additives such as a rust preventive, an antioxidant, a ultraviolet absorber, an oxygen absorber, and a dissolution aid that can be usually used in the ink for ink jet may be contained.

1. 2. Second Ink

The second ink constituting the ink jet ink set for textile printing according to the present embodiment is an ink having a hue angle ∠H° defined in a CIELAB color space in the range of 130° or more and 180° or less and a lightness L* defined in a CIELAB color space in the range of 15 or more and 30 or less on the textile printed material after textile printing. The second ink is an ink exhibiting a so-called dark green color.

The second ink contains a sublimation dye. Examples of the sublimation dye contained in the second ink include C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, it is preferable to include one or more selected from C. I. Disperse Blue 72, C. I. Disperse Blue 359, C. I. Disperse Blue 360, C. I. Solvent Violet 13, and C. I. Disperse Violet 28 and one or more selected from C. I. Disperse Yellow 54, C. I. Disperse Yellow 232, and C. I. Solvent Yellow 145. As a result, colors having the hue angle ∠H° on the printed textile printed material in the range of 130° or more and 180° or less, and the lightness L* in the range of 15 or more and 30 or less can be reproduced with good quality.

The content of the sublimation dye is preferably 3% by mass or more, more preferably 4% by mass or more, and particularly preferably 5% by mass or more with respect to the entire second ink. The content of the sublimation dye is preferably 10% by mass or less, more preferably 9% by mass or less, and particularly preferably 8% by mass or less with respect to the entire second ink. As a result, there is a tendency that the colors having the hue angle ∠H° on the printed textile printed material in the range of 130° or more and 180° or less, and the lightness L* in the range of 15 or more and 30 or less can be reproduced with good quality.

The components other than the sublimation dye contained in the second ink are the same as those in the first ink.

1. 3. Third Ink

The third ink constituting the ink jet ink set for textile printing according to the present embodiment is an ink having a hue angle ∠H° defined in a CIELAB color space in the range of 0° or more and 45° or less and a lightness L* defined in a CIELAB color space in the range of 15 or more and 30 or less on the textile printed material after textile printing. The third ink is an ink exhibiting a so-called dark orange color.

The third ink contains a sublimation dye. Examples of the sublimation dye contained in the third ink C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, it is preferable to include one or more selected from C. I. Disperse Blue 72, C. I. Disperse Blue 359, C. I. Disperse Blue 360, C. I. Solvent Violet 13, and C. I. Disperse Violet 28 and one or more selected from C. I. Disperse Red 60, C. I. Disperse Red 154, C. I. Disperse Red 191, C. I. Disperse Brown 27, C. I. Disperse Orange 25, and C. I. Solvent Orange 60. As a result, colors having the hue angle ∠H° on the printed textile printed material in the range of 0° or more and 45° or less, and the lightness L* in the range of 15 or more and 30 or less can be reproduced with good quality.

The content of the sublimation dye is preferably 3% by mass or more, more preferably 4% by mass or more, and particularly preferably 5% by mass or more with respect to the entire third ink. The content of the sublimation dye is preferably 10% by mass or less, more preferably 9% by mass or less, and particularly preferably 8% by mass or less with respect to the entire third ink. As a result, there is a tendency that the colors having the hue angle ∠H° on the printed textile printed material in the range of 0° or more and 45° or less, and the lightness L* in the range of 15 or more and 30 or less can be reproduced with good quality.

The components other than the sublimation dye contained in the third ink are the same as those of the first ink.

1. 4. Cyan Ink 1. 4. 1. Dye

The cyan ink constituting the ink jet ink set for textile printing according to the present embodiment contains a sublimation dye. Examples of the sublimation dye contained in the cyan ink include C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, it is preferable to include one or more selected from C. I. Solvent Blue 36, 105, C. I. Disperse Blue 19, 26, 26: 1, 35, 56, 58, 64, 72, 81, 91, 95, 108, 359 and C. I. Disperse Blue 360.

The content of the sublimation dye is preferably 2% by mass or more, more preferably 3% by mass or more, and particularly preferably 4% by mass or more with respect to the entire cyan ink. The content of the sublimation dye is preferably 7% by mass or less, more preferably 6% by mass or less, and particularly preferably 5% by mass or less with respect to the entire cyan ink.

The components other than the sublimation dye contained in the cyan ink are the same as those of the first ink.

1. 5. Magenta Ink

The magenta ink constituting the ink jet ink set for textile printing according to the present embodiment contains a sublimation dye. Examples of the sublimation dye contained in magenta ink include C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, it is preferable to include one or more selected from C. I. Disperse Red 4, 11, 53, 55, 59, 60, 65, 70, 75, 146, 154, 190, 191, 207, 239, and C. I. Bat Red 41.

The content of the sublimation dye is preferably 3% by mass or more, more preferably 4% by mass or more, and particularly preferably 5% by mass or more with respect to the entire magenta ink. The content of the sublimation dye is preferably 9% by mass or less, more preferably 8% by mass or less, and particularly preferably 7% by mass or less with respect to the entire magenta ink.

The components other than the sublimation dye contained in the magenta ink are the same as those of the first ink.

1. 6. Yellow Ink

The yellow ink constituting the ink jet ink set for textile printing according to the present embodiment contains a sublimation dye. Examples of the sublimation dye contained in the yellow ink include C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, it is preferable to include one or more selected from C. I. Solvent Yellow 145, C. I. Disperse Yellow 3, 7, 8, 23, 39, 51, 54, 60, 71, 82, 86, 232, and C. I. Disperse Yellow 241.

The content of the sublimation dye is preferably 1% by mass or more, more preferably 2% by mass or more, and particularly preferably 2.5% by mass or more with respect to the entire yellow ink. The content of the sublimation dye is preferably 5% by mass or less, more preferably 4% by mass or less, and particularly preferably 3% by mass or less with respect to the entire yellow ink.

The components other than the sublimation dye contained in the yellow ink are the same as those of the first ink.

1. 7. Black Ink

The black ink constituting the ink jet ink set for textile printing according to the present embodiment contains a sublimation dye. Examples of the sublimation dye contained in the black ink include C. I. Solvent Blue 36, 105, C. I. Disperse Blue 19, 26, 26: 1, 35, 56, 58, 64, 72, 81, 91, 95, 108, 359, 360; C. I. Disperse Red 4, 11, 53, 55, 59, 60, 65, 70, 75, 146, 154, 190, 191, 207, 239, C. I. Bat Red 41; C. I. Solvent Yellow 145, C. I. Disperse Yellow 3, 7, 8, 23, 39, 51, 54, 60, 71, 82, 86, 232, 241; C. I. Solvent Orange 60, C. I. Disperse Orange 1, 5, 20, 25, 33, 56, 60, 76; C. I. Solvent Violet 13, C. I. Disperse Violet 8, 13, 17, 23, 27, 28, 36, 57; C. I. Disperse brown 27, and the like.

Among these sublimation dyes, it is preferable to include one or more selected from C. I. Solvent Blue 36, 105, C. I. Disperse Blue 19, 26, 26: 1, 35, 56, 58, 64, 72, 81, 91, 95, 108, 359, and C. I. Disperse Blue 360, one or more selected from C. I. Disperse Red 4, 11, 53, 55, 59, 60, 65, 70, 75, 146, 154, 190, 191, 207, 239, and C. I. Bat Red 41, and one or more selected from C. I. Solvent Yellow 145, C. I. Disperse Yellow 3, 7, 8, 23, 39, 51, 54, 60, 71, 82, 86, 232, and C. I. Disperse Yellow 241.

The content of the sublimation dye is preferably 4% by mass or more, more preferably 5% by mass or more, and particularly preferably 6% by mass or more with respect to the entire black ink. The content of the sublimation dye is preferably 10% by mass or less, more preferably 9% by mass or less, and particularly preferably 8% by mass or less with respect to the entire black ink.

The components other than the sublimation dye contained in the black ink are the same as those of the first ink.

1. 8. Ink Manufacturing Method and Physical Characteristics

The ink constituting the ink jet ink set for textile printing according to the present embodiment is obtained by mixing the above-described components in a predetermined order and filtering or the like as necessary to remove impurities. As a method of mixing each component, a method of sequentially adding materials to a container provided with a stirring device such as a mechanical stirrer or a magnetic stirrer and stirring and mixing these is preferably used.

The surface tension of the above-described ink constituting the ink jet ink set for textile printing according to the present embodiment is preferably 20 mN/m or more and 40 mN/m or less, and more preferably 22 mN/m or more and 35 mN/m or less from the viewpoint of the balance between the textile printing quality and the reliability as an ink jet ink. In addition, from the same viewpoint, the viscosity of the ink at 20° C. is preferably 1. 5 mPa·s or more and 10 mPa·s or less, and more preferably 2 mPa·s or more and 8 mPa·s or less. In order to keep the surface tension and viscosity within the above ranges, the types of the above-described water-soluble organic solvent and surfactant, the amount of these and water added, and the like may be appropriately adjusted.

2. Recording Method

The above-described ink jet ink set for textile printing can be suitably applied to a direct sublimation textile printing method, which is a method of directly dyeing a recording target medium as a fabric or the like, or a sublimation transfer textile printing method, which is a dyeing method for a fabric or the like using sublimation transfer. The recording method according to the embodiment of the present disclosure includes a step of ejecting the above-described ink jet ink set for textile printing by an ink jet method and recording on the recording target medium.

Hereinafter, a dyeing method using sublimation transfer will be described as an example of a recording method using the above-described ink jet ink set for textile printing according to the present disclosure.

As a dyeing method using sublimation transfer, for example, there is a method in which printing is performed by an ink jet method using an ink containing a sublimation dye on a sheet-shaped intermediate transfer medium (transfer paper) such as paper, the intermediate transfer medium is superposed on the recording target medium such as a fabric, and sublimation transfer is performed by heating.

2. 1. Adhesion Step

The recording method according to the present embodiment preferably includes an adhesion step of ejecting the above-described ink jet ink for textile printing from the recording head and adhering the ink to the recording surface of the intermediate transfer medium (transfer paper) by using the ink jet method. Ink ejection by the ink jet method can be performed using a droplet ejection apparatus (for example, an ink jet recording apparatus described later).

As the intermediate transfer medium (transfer paper), for example, a paper such as a plain paper, a recording medium provided with an ink receiving layer (referred to as a dedicated paper for ink jet or a coated paper) and the like can be used, and a paper provided with an ink receiving layer made of inorganic particles such as silica is more preferable. As a result, in a process of drying the ink applied to the intermediate transfer medium, it is possible to obtain an intermediate recorded material in which bleeding and the like are suppressed on the recording surface. In addition, with such an intermediate transfer medium, the sublimation dye can be more easily retained on the surface of the recording surface, and the sublimation dye can be sublimated more efficiently in a subsequent transfer step.

Since the intermediate transfer medium (transfer paper) having a thin thickness receives a small amount of ink, when such a transfer paper is used, the harmful effects due to a large amount of ink landing on the image forming portion are remarkable. However, according to the recording method according to the present embodiment, since the above-described ink jet ink set for textile printing is used, even when a specific chromatic color image having low lightness is formed, the amount of ink landing on the image forming portion can be reduced. Therefore, even when the transfer paper having the thin thickness is used, it is possible to form a specific chromatic color image having a preferably low lightness. In addition, by using the transfer paper having the thin thickness, the resources required for the transfer paper can be saved and the cost can be reduced.

In this step, a plurality of types of the above-described ink jet inks for textile printing may be used.

2. 2. Heating Step

The recording method according to the present embodiment preferably includes a heating step of heating the transfer paper after the adhesion step. The heating step is a step of ejecting the above-described ink jet ink for textile printing onto a transfer paper (intermediate recording medium) and then heating the ink. By performing the heating step, the drying of the ink adhered in the adhesion step may be promoted, bleeding of the image may be suppressed, and set-off may be suppressed. The "set-off" refers to a phenomenon in which the ink component moves to the rear surface in contact with the recording surface, for example, when the transfer paper is stacked, such as when the paper is rolled up with a roll.

The temperature reached by the transfer paper in the heating step is preferably 60° C. or higher, more preferably 70° C. or higher and 120° C. or lower, and particularly preferably 70° C. or higher and 110° C. or lower. Within such a range, the sublimation dye is unlikely to sublimate and a good drying rate can be obtained.

2. 3. Other Steps

The recording method according to the present embodiment may include a preheating step of heating at least one of the recording head and the transfer paper in the adhesion step. Furthermore, the recording method according to the present embodiment may include a step of disposing the fabric on the recording surface of the transfer paper and a step of heating the transfer paper and the fabric.

The preheating step is, for example, a step of heating the recording head by radiant heat. According to the above-described ink jet ink set for textile printing, nozzle clogging can be suppressed even when the recording head is heated, and ejection stability can be ensured. The heating temperature at the time of ejecting the ink is, for example, preferably 30° C. to 60° C., and more preferably 40° C. to 60° C.

The transfer paper may be heated in the preheating step. In this manner, the above-described ink jet ink for textile printing adheres to the heated transfer paper, so that it is likely to dry quickly after the adhesion, and bleeding and set-off of the image can be further suppressed. The surface temperature of the transfer paper is, for example, preferably 30° C. to 60° C., more preferably 35° C. to 50° C., and particularly preferably 35° C. to 45° C.

The recording method according to the present embodiment may include a step of heating the recording surface of the intermediate transfer medium (transfer paper) to which the ink is applied in a state of facing a dyeing target material (recording target medium: fabric, and the like), that is, a state where the fabric or the like is placed on the recording surface of the transfer paper, and transferring the sublimation dye contained in the above-described ink jet ink for textile printing to the dyeing target material. As a result, a dyed material using the fabric or the like as a dyeing target material can be obtained.

Although the heating temperature in the transfer step is not particularly specified, the heating temperature is 160° C. or higher and 220° C. or lower, and preferably 170° C. or higher and 200° C. or lower. As a result, sufficient energy can be applied to transfer the sublimation dye to the dyeing target material, and the productivity of the dyed material can be improved.

Although the heating time in the transfer step depends on the heating temperature, the heating time is 30 seconds or more and 90 seconds or less, and preferably 45 seconds or more and 60 seconds or less. As a result, sufficient energy can be obtained to transfer the sublimation dye to the dyeing target material, and the productivity of the dyed material can be further improved.

In addition, the transfer step may be performed by heating the intermediate transfer medium to which the above-described ink jet ink for textile printing is applied in a state of facing the dyeing target material, and it is more preferable to perform the transfer step by heating the intermediate transfer medium and the dyeing target material in a state of being in close contact with each other. As a result, for example, a clearer image can be recorded (dyed) on the fabric or the like.

As the dyeing target material, for example, a sheet-like material such as a fabric (hydrophobic fiber fabric or the like) or a resin (plastic) film is preferably used, and a material having a three-dimensional shape such as a spherical shape or a rectangular parallelepiped shape other than the sheet shape may be used.

In addition, as the dyeing target material, for example, glass, metal, or ceramics may be used in addition to those made of resin or plastic. Examples of the fibers constituting the fabric as the dyeing target material include polyester fibers, nylon fibers, triacetate fibers, diacetate fibers, polyamide fibers, and blended products using two or more of these fibers. In addition, a blended product of these with recycled fibers such as rayon or natural fibers such as cotton, silk and wool may be used.

In addition, examples of the resin (plastic) film as the dyeing target material include a polyester film, a polyurethane film, a polycarbonate film, a polyphenylene sulfide film, a polyimide film, a polyamide-imide film, and the like. The resin (plastic) film may be a laminated body in which a plurality of layers are laminated, or may be made of a gradient material in which the composition of the material changes in a gradient manner.

3. Recording Apparatus

An ink jet recording apparatus according to the embodiment of the present disclosure is provided with an ink container that contains inks constituting the above-described ink jet ink set for textile printing. The ink jet recording apparatus according to the present embodiment is not particularly limited as long as the apparatus includes at least the ink container (cartridge, tank, and the like) containing the above-described ink jet ink for textile printing and a recording head coupled to thereto, and the ink can be ejected from the recording head to form an image on the intermediate transfer medium (transfer paper or the like) or the recording target medium.

3. 1. Apparatus Configuration

As the ink jet recording apparatus according to the present embodiment, either a serial type or a line type can be used. The recording heads are mounted on these types of ink jet recording apparatuses, and the ink droplets can be ejected from the nozzle hole of the recording head at a predetermined timing (intermittently) and at a predetermined volume (mass) and the ink can be adhered to the transfer paper to form a predetermined image, while changing the relative positional relationship between the transfer paper and the recording head.

Here, in general, in a serial type ink jet recording apparatus, the transport direction of the intermediate transfer medium (transfer paper) and the reciprocating direction of the recording head intersect each other, and the relative positional relationship between the intermediate transfer medium and the recording head is changed by combining the reciprocating operation of the recording head and the transporting operation of the intermediate transfer medium (including the reciprocating operation). In addition, in this case, in general, a plurality of nozzle holes (holes for ejecting ink) are disposed in the recording head, and a row of nozzle holes (nozzle row) is formed along the transport direction of the intermediate transfer medium. In addition, the recording head may be formed with a plurality of nozzle rows depending on the type and number of inks.

In addition, in general, in a line-type ink jet recording apparatus, the recording head does not reciprocate, and the relative positional relationship between the intermediate transfer medium and the recording head is changed by transporting the intermediate transfer medium to change the relative positional relationship between the intermediate transfer medium and the recording head. Also in this case, in general, the plurality of nozzle holes are disposed in the recording head, and the row of nozzle holes (nozzle row) is formed along a direction intersecting the transport direction of the intermediate transfer medium.

The ink jet recording method uses a serial type or line type ink jet recording apparatus, and the method is not particularly limited as long as the ink can be ejected as droplets from the fine nozzle holes and the droplets can be adhered to the intermediate transfer medium. For example, as the droplet ejection method (ink jet method), a piezo method, a method of ejecting the ink by bubbles generated by heating the ink, or the like can be used, and the piezo method is preferable from the viewpoint of difficulty in deteriorating the ink.

For the ink jet recording apparatus according to the present embodiment, for example, known configurations such as a heating unit, a drying unit, a roll unit, and a winding device can be adopted without limitation.

Figure 1:
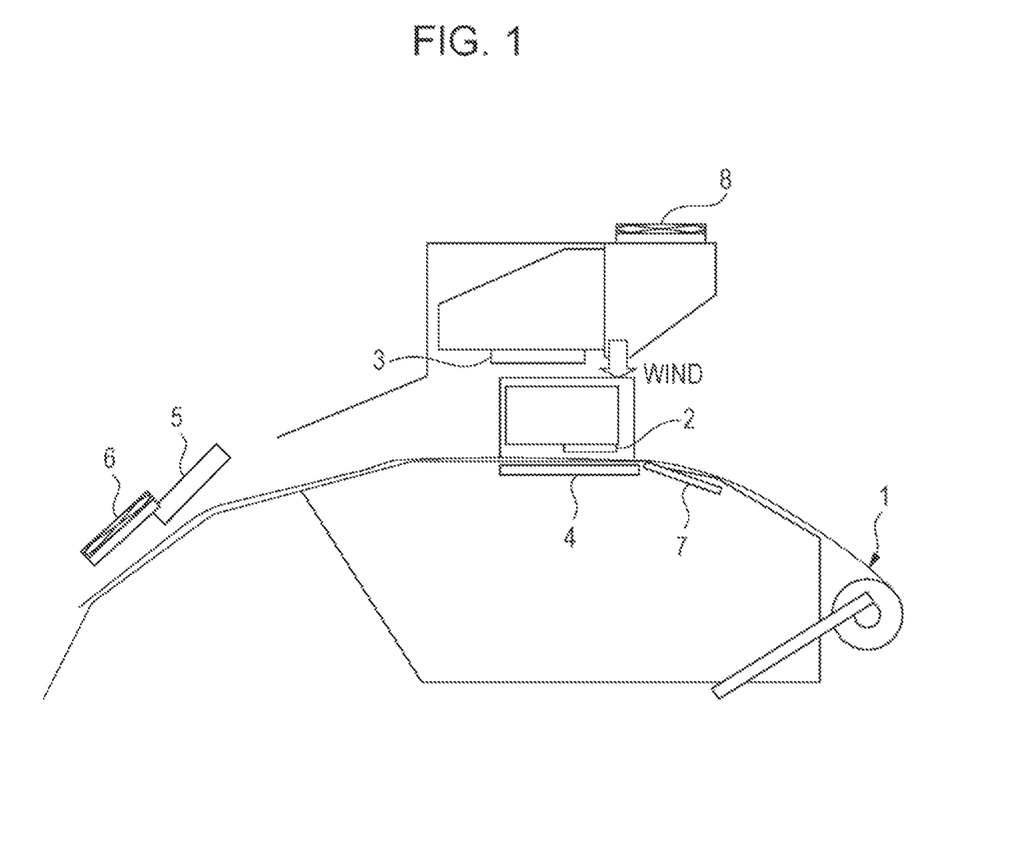
FIG. 1 is a schematic view illustrating an outline of an ink jet recording apparatus according to an embodiment.

An example of the recording apparatus according to the present embodiment will be described below. FIG. 1 illustrates a schematic cross-sectional view of the ink jet recording apparatus according to one embodiment. As illustrated in FIG. 1, the recording apparatus 1 is provided with a recording head 2, an IR heater 3, a platen heater 4, an after heater 5, a cooling fan 6, a preheater 7, and a ventilation fan 8.

The recording head 2 ejects the ink onto the transfer paper. As the recording head 2, a known method in the related art can be used. An example of a known method is a head that ejects droplets by utilizing the vibration of a piezoelectric element, that is, a head that forms ink droplets by mechanical deformation of an electrostrictive element. The recording head 2 can eject ink dots in multiple sizes from, for example, one nozzle.

In the above-described heating step, the transfer paper is heated after the adhesion step, and such a step can be performed by the after heater 5 in the recording apparatus 1. In addition, although not illustrated, means such as a warm air mechanism (not illustrated) and a constant temperature bath (not illustrated) may be used. The after heater 5 heats and dries the transfer paper to which the ink is adhered. By heating the transfer paper on which the image is recorded, the after heater 5 evaporates and scatters the water contained in the ink more quickly, thereby bleeding and the like are suppressed. The after heater 5 preferably heats the transfer paper to 70° C. or higher, more preferably 70° C. or higher and 110° C. or lower.

In the above-described preheating step, at least one of the recording head and the transfer paper is heated, and in the recording apparatus 1, such a step can be performed by the IR heater 3 that directly heats the recording head 2 or the platen heater 4 that heats the transfer paper and the recording head 2 via the transfer paper.

When the IR heater 3 is used, the transfer paper can be heated from the recording head 2 side. As a result, the recording head 2 is likely to be simultaneously heated, and the temperature can be raised without being affected by the thickness of the transfer paper as compared with the case where the recording head 2 is heated from the rear surface of the transfer paper such as the platen heater 4. In addition, when the platen heater 4 is used, the transfer paper can be heated from the side opposite to the recording head 2 side. As a result, the recording head 2 is relatively unlikely to be heated.

It is preferable that the recording apparatus 1 is further provided with a transfer paper heating unit that heats the transfer paper so that the surface temperature of the transfer paper is approximately 30° C. to 60° C. when the ink is ejected to the transfer paper. A more preferable temperature is 35° C. to 50° C., and a particularly preferable temperature is 35° C. to 45° C. The transfer paper heating unit is not particularly limited, and examples thereof include the IR heater 3 and the platen heater 4. By including the transfer paper heating unit, the ink adhering to the transfer paper can be dried more quickly, and the bleeding of the image can be further suppressed.

The above-described "heating the transfer paper" means raising the temperature of the transfer paper to a desired temperature, and is not limited to directly heating the transfer paper. The recording apparatus 1 may include a cooling fan 6. After drying, the ink on the transfer paper is cooled by the cooling fan 6, so that a film with good adhesion tends to be formed on the transfer paper.

In addition, the recording apparatus 1 may be provided with a preheater 7 that heats in advance (preheats) the transfer paper before the ink is ejected on the transfer paper. Furthermore, the recording apparatus 1 may be provided with a ventilation fan 8 so that the ink adhering to the transfer paper dries more efficiently.

3. 2. Arrangement of Ink Container

Figure 2:
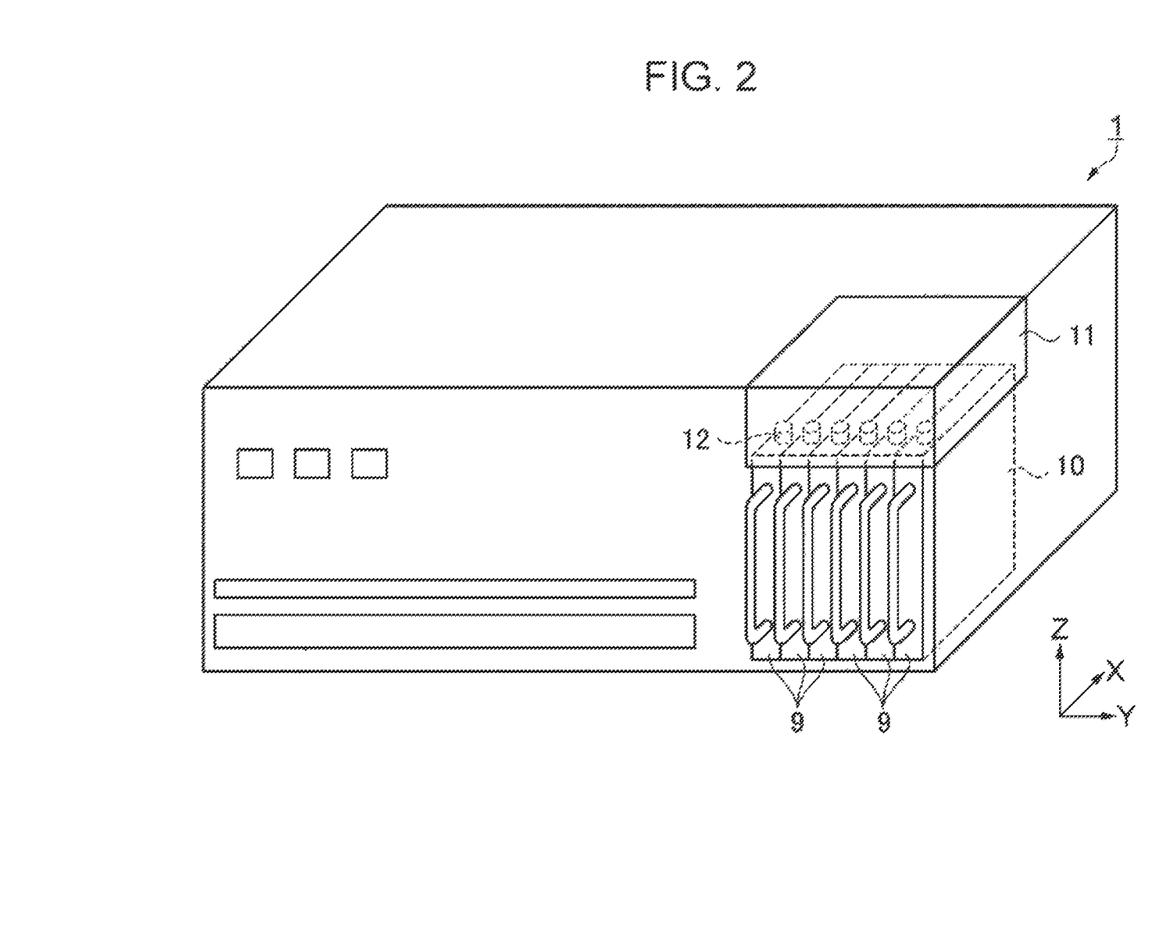
FIG. 2 is an external perspective view illustrating an example of a periphery of an ink container of the ink jet recording apparatus.
Figure 3:
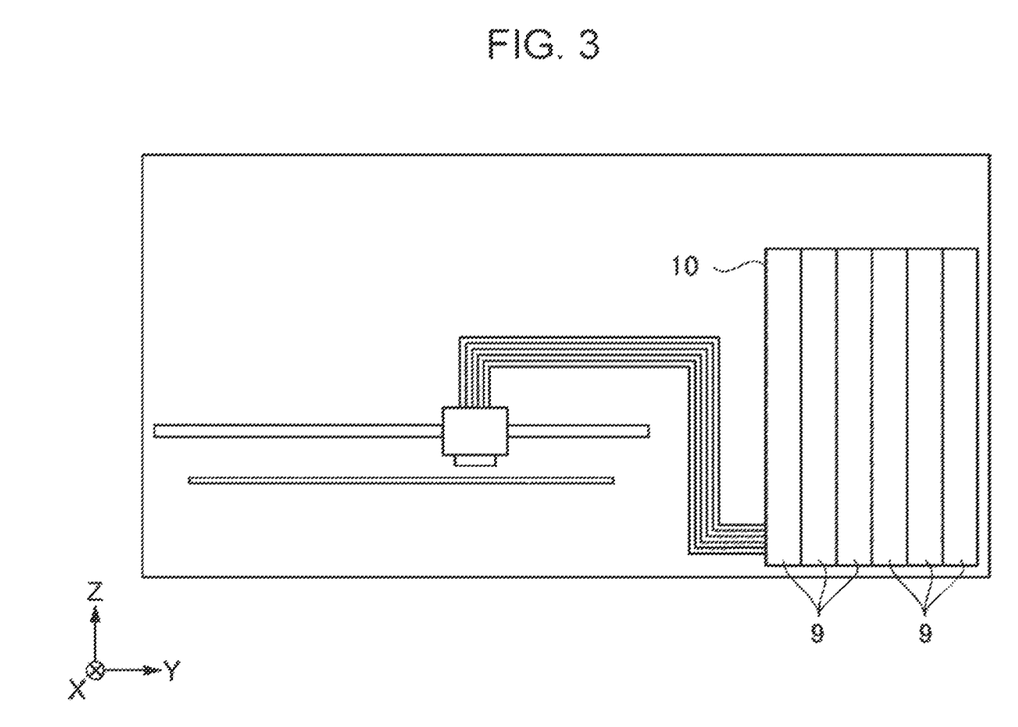
FIG. 3 is a schematic view illustrating a rough internal structure of the periphery of the ink container of the ink jet recording apparatus.
Figure 4:
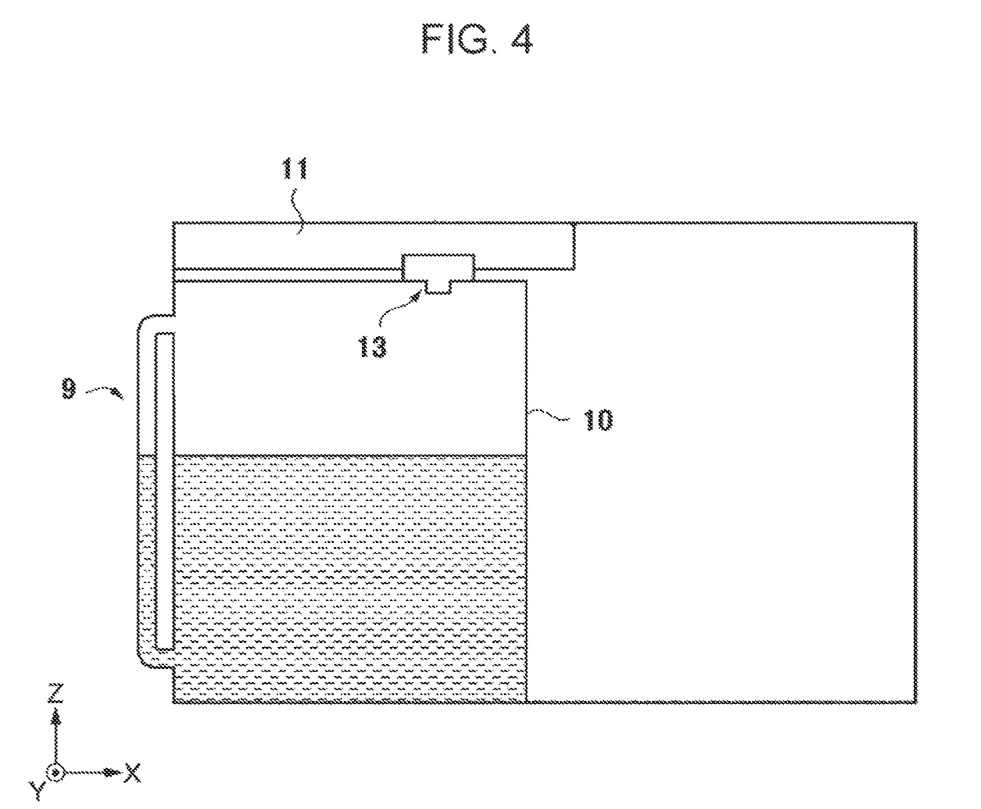
FIG. 4 is a schematic view illustrating a state of the ink container.

Hereinafter, an example of the ink container for containing the above-described ink jet ink for textile printing included in the recording apparatus according to the present embodiment will be described. FIGS. 2 to 4 illustrate schematic views of the ink jet recording apparatus according to an example of the present embodiment. As illustrated in FIGS. 2 to 4, the recording apparatus 1 is provided with a liquid storage unit 9, an ink container 10, an upper lid 11, a cap member 12, and an ink pour 13.

As illustrated in FIG. 2, the liquid storage unit 9 includes the ink container 10 that contains any of the above-described ink jet inks for textile printing.

The ink container 10 is a box-shaped hollow container. The ink pour 13 and the cap member 12 are provided on the Z (+) direction side of the ink container 10. The cap member 12 is inserted into the ink pour 13 to prevent foreign matter from entering the ink contained in the ink container 10 and the ink from drying. Furthermore, the ink container 10 is provided with an air communication hole (not illustrated), and the inside of the ink container 10 is maintained at atmospheric pressure. When the amount of ink contained in the ink container 10 is low, the user removes the cap member 12 and replenishes the ink container 10 with the ink.

As the ink jet recording apparatus illustrated in FIGS. 2 to 4, the ink container preferably includes an ink pour for replenishing the ink. When the ink container includes the ink pour, it is economical because the ink container can be directly replenished with ink, and since the consumption of resources related to consumables and packaging materials can be reduced, the environmental load is reduced. On the other hand, when replenishing the ink container having the ink pour with the ink, there is a risk that the user may replenish the wrong container, the ink may scatter, or overflow from the container. Therefore, in the ink jet recording apparatus according to the present embodiment, it is preferable that the ink containers containing the above-described ink jet ink for textile printing have a specific arrangement as illustrated below.

The arrangement of the ink containers included in the ink jet recording apparatus according to the present embodiment is preferably at least one of an arrangement in which an ink container containing the first ink and an ink container containing the black ink are disposed at positions adjacent to each other, an arrangement in which an ink container containing the first ink and an ink container containing the cyan ink are disposed at positions adjacent to each other, and an arrangement in which an ink container containing the first ink and an ink container containing the yellow ink are disposed at positions adjacent to each other.

In addition, the arrangement of the ink containers included in the ink jet recording apparatus according to the present embodiment is preferably at least one of an arrangement in which an ink container containing the second ink and an ink container containing the black ink are disposed at positions adjacent to each other, an arrangement in which an ink container containing the second ink and an ink container containing the cyan ink are disposed at positions adjacent to each other, and an arrangement in which an ink container containing the second ink and an ink container containing the yellow ink are disposed at positions adjacent to each other.

In addition, the arrangement of the ink containers included in the ink jet recording apparatus according to the present embodiment is preferably at least one of an arrangement in which an ink container containing the third ink and an ink container containing the black ink are disposed at positions adjacent to each other, an arrangement in which an ink container containing the third ink and an ink container containing the cyan ink are disposed at positions adjacent to each other, and an arrangement in which an ink container containing the third ink and an ink container containing the magenta ink are disposed at positions adjacent to each other.

With such an arrangement in which the inks of similar colors contained in the ink container are disposed at positions adjacent to each other, when replenishing the ink container having the ink pour with the ink, even when the ink scatters or overflows from the container, a small amount of the ink is mixed in the containers disposed at positions adjacent to each other, and the colors are mixed in the container, it is possible to reduce the fluctuation in ink color.

In addition, the arrangement of the ink containers included in the ink jet recording apparatus of the present embodiment is preferably at least one of an arrangement in which an ink container containing the first ink and an ink container containing the magenta ink are disposed at positions not adjacent to each other, an arrangement in which an ink container containing the second ink and an ink container containing the magenta ink are disposed at positions not adjacent to each other, and an arrangement in which an ink container containing the third ink and an ink container containing the yellow ink are disposed at positions not adjacent to each other.

With such an arrangement in which the inks contained in the ink container, which have large color fluctuations when mixed with each other, are disposed at positions not adjacent to each other, when replenishing the ink container having the ink pour with the ink, even when the ink scatters or overflows from the container and is mixed in the containers disposed at positions adjacent to each other, it is possible to reduce the possibility of color mixing in which color fluctuation is large.

Furthermore, the arrangement of the ink containers included in the ink jet recording apparatus of the present embodiment is preferably at least one of an arrangement in which an ink container containing the first ink and an ink container containing the black ink are disposed at positions not adjacent to each other, an arrangement in which an ink container containing the second ink and an ink container containing the black ink are disposed at positions not adjacent to each other, and an arrangement in which an ink container containing the third ink and an ink container containing the black ink are disposed at positions not adjacent to each other.

With such an arrangement in which the inks of similar colors contained in the ink container are disposed at positions not adjacent to each other, when replenishing with the ink, it is possible to reduce the possibility of replenishing the wrong container.

4. Example

Hereinafter, the present disclosure will be described in more detail with reference to examples and comparative examples, and the present disclosure is not limited to these examples. Unless otherwise specified, "parts" and "%" in the examples and the comparative examples are based on mass.

4. 1. Preparation of Ink Jet Ink for Textile Printing

Each component is placed in a container so as to have the composition illustrated in Table 1, mixed and stirred with a magnetic stirrer for 2 hours, and then filtered through a membrane filter having a pore size of 1 ρm. Therefore, ink jet inks for textile printing of C, M, Y, and K used in Examples 1 to 8 and the comparative example were obtained. The numerical values in Table 1 indicate by mass, and ion-exchanged water was added so that the total mass of the ink jet ink for textile printing was 100% by mass. In addition, in Table 1, "C" represents cyan ink, "M" represents magenta ink, "Y" represents yellow ink, and "K" represents black ink.

TABLE 1

| | Ink composition | | | | | | | | |
|---|---|---|---|---|---|---|---|---|---|
| | | Example | | | | | | | |
| Ink composition | | 1 | 2 | 3 | 4 | 5 | 6 | 7 | 8 |
| Disperse dye | Disperse Red 60 | | | | | | | | |
| | Disperse Yellow 54 | 0.3 | 0.8 | | | 3 | 3 | | |
| | Disperse Blue 359 | | | | | 4.5 | 4.5 | | |
| | Disperse Blue 360 | | | 1 | 1 | | | | |
| | Disperse Violet 28 | | | | | 1.5 | | 4.7 | |
| | Solvent Violet 13 | 5 | 5 | 5 | 5 | | 1.5 | | 4.7 |
| | Disperse Orange 25 | | | 0.6 | | | | 2.5 | 4.3 |
| | Solvent Orange 60 | | | 0.6 | | | | | |
| | Disperse Brown 27 | | | | 1.1 | | | | |
| Dispersant | Naphthalene sulfonic acid Na condensate | 5.3 | 5.8 | 7.2 | 7.1 | 9 | 9 | 7.2 | 9 |
| Surfactant | BYK348 | 0.8 | 0.8 | 0.8 | 0.8 | 0.8 | 0.8 | 0.8 | 0.8 |
| Organic solvent | Glycerin | 20 | 20 | 15 | 15 | 15 | 15 | 15 | 15 |
| | Propylene glycol | 5 | 5 | 5 | 5 | 5 | 10 | 5 | 5 |
| | Methyl triglycol | 3 | 3 | 3 | 3 | 3 | 3 | 3 | 3 |
| Preservative | Proxel XL2 | 0.2 | 0.2 | 0.2 | 0.2 | 0.2 | 0.2 | 0.2 | 0.2 |
| Water | Ion-exchanged water | Remaining amount | Remaining amount | Remaining amount | Remaining amount | Remaining amount | Remaining amount | Remaining amount | Remaining amount |
| | Total | 100 | 100 | 100 | 100 | 100 | 100 | 100 | 100 |

| | | Comparative Example ink used | | | |
|---|---|---|---|---|---|
| Ink composition | | C | M | Y | K |
| Disperse dye | Disperse Red 60 | | 6 | | 2.2 |
| | Disperse Yellow 54 | | | 2.7 | 0.6 |
| | Disperse Blue 359 | 4.5 | | | 4.5 |
| | Disperse Blue 360 | | | | |
| | Disperse Violet 28 | | | | |
| | Solvent Violet 13 | | | | |
| | Disperse Orange 25 | | | | |
| | Solvent Orange 60 | | | | |
| | Disperse Brown 27 | | | | |
| Dispersant | Naphthalene sulfonic acid Na condensate | 4.5 | 6 | 2.7 | 7.3 |
| Surfactant | BYK348 | 0.8 | 0.8 | 0.8 | 0.8 |
| Organic solvent | Glycerin | 20 | 15 | 20 | 15 |
| | Propylene glycol | 5 | 5 | 5 | 5 |
| | Methyl triglycol | 3 | 3 | 3 | 3 |
| Preservative | Proxel XL2 | 0.2 | 0.2 | 0.2 | 0.2 |
| Water | Ion-exchanged water | Remaining amount | Remaining amount | Remaining amount | Remaining amount |
| | Total | 100 | 100 | 100 | 100 |

In Table 1, the materials listed other than the compound names are as follows.

BYK348 (trade name, manufactured by Big Chemie Japan, polyether-modified organosiloxane)

Proxel XL2 (trade name, manufactured by Lonza, preservative, 1,2-benzoisothiazolin-3-one)

4. 2. Evaluation Method 4. 2. 1. Evaluation of Hue Angle and Lightness of Printed Matter Using the inks illustrated in Table 1, the hue angle ∠H° and lightness L* of the textile printed material were evaluated as follows. An ink jet printer (manufactured by Seiko Epson Corporation, trade name "PX-G930") was filled with the inks illustrated in Table 1, and an image was formed on a transfer paper (manufactured by Sappi Co., Ltd., trade name "Transjet Sportsline"). Specifically, a fill pattern that can be recorded under the condition of the amount of ink injection of 12 mg/inch$^2$ at a resolution of 720 dpi in the horizontal direction and 720 dpi in the vertical direction and the amount of ink ejection of 100% duty was prepared and used.

Next, the recording surface of the transfer paper on which the image is formed faces the white polyester fabric (manufactured by Toray Co., Ltd., trade name "SS-755 K-1", whiteness L* value 89), and heat transfer is performed at a temperature of 200° C. for 60 seconds at a pressure of 4.2 N/cm$^3$ using a heat press machine (manufactured by Taiyo Seiki Co., Ltd., trade name "TP-608M").

The hue angle ∠H° and lightness L* were calculated from the a* value and b* value obtained from the obtained evaluation sample using a spectrophotometer (trade name "FD-7", manufactured by Konica Minolta Co., Ltd., measurement conditions: light source D65, filter D65, φ2 degrees). Similarly, for the whiteness L* of each fabric was measured using a spectrophotometer (trade name "FD-7", manufactured by Konica Minolta Co., Ltd., measurement conditions: light source D65, filter D65, φ2 degrees). Table 2 illustrates the values of the hue angle ∠H° and the lightness L* measured in each example.

4. 2. 2. Abrasion Resistance Evaluation

A printed matter with the same pattern was obtained by the same method as in "4. 2. 1. Evaluation of hue angle and lightness of printed matter". Thereafter, the abrasion resistance was evaluated by confirming the peeling state of the recording surface and the ink transfer state to a cotton cloth when rubbed with the cotton cloth 20 times under a load of 200 g using the Gakushin type friction fastness tester "AB-301" (trade name, manufactured by Tester Sangyo Co., Ltd.) on the recording surface of the recorded material left for 1 hour in a laboratory under room temperature (25° C.) conditions. The evaluation criteria are illustrated below. The evaluation results are illustrated in Table 2.

Evaluation Criteria

A: No color transfer or peeling was observed.
B: Color transfer and peeling were slightly observed.
C: Color transfer and peeling were significantly observed.

4. 2. 3. Bleeding Evaluation

By the same method as that in "4. 2. 1. Evaluation of hue angle and lightness of printed matter", the solid patterns of each color were printed so as to be adjacent to each other, and bleeding at a boundary portion is visually observed to evaluate the bleeding. This evaluation was performed in a laboratory under room temperature (25° C.) conditions. The evaluation criteria are illustrated below. The evaluation results are illustrated in Table 2.

Evaluation Criteria

A: No bleeding was observed at the boundary portion.
B: Bleeding was slightly observed at the boundary portion.
C: Bleeding was significantly observed at the boundary portion.

4. 2. 4. Evaluation of Transfer Unevenness

An ink jet printer (manufactured by Seiko Epson Corporation, trade name "PX-G930") was filled with the ink, and an image was formed on a transfer paper (manufactured by Sappi Co., Ltd., trade name "Transjet Sportsline"). Specifically, a fill pattern that can be recorded under the condition of the amount of ink injection of 12 mg/inch$^2$ at a resolution of 720 dpi in the horizontal direction and 720 dpi in the vertical direction and the amount of ink ejection of 100% duty was prepared in A4 size and used.

Next, the recording surface of the transfer paper on which the image is formed faces the white polyester fabric (manufactured by Toray Co., Ltd., trade name "SS-755 K-1", whiteness L* value 89), and heat transfer is performed at a temperature of 200° C. for 60 seconds at a pressure of 4.2 N/cm$^3$ using a heat press machine (manufactured by Taiyo Seiki Co., Ltd., trade name "TP-608M").

At this time, the transfer unevenness was evaluated by visually observing the degree of occurrence of the transfer unevenness. The evaluation criteria are illustrated below. The evaluation results are illustrated in Table 2.

Evaluation Criteria

A: No color unevenness after transfer was observed.
B: Color unevenness after transfer was slightly observed.
C: Color unevenness after transfer was significantly observed.

4. 2. 5. Set-Off Property Evaluation

A printed matter with the same pattern was obtained by the same method as in "4. 2. 1. Evaluation of hue angle and lightness of printed matter". 10 seconds after printing, the same medium as the recording medium was placed on the textile printed material, a load of 500 g was applied to the medium, and the medium was allowed to stand for 10 minutes. The set-off property was evaluated by visually observing the color transfer of the medium placed on the top after standing. The evaluation criteria are illustrated below. The evaluation results are illustrated in Table 2.

Evaluation Criteria

A: No set-off was observed.
B: Color transfer was slightly observed.
C: Color transfer was significantly observed.

4. 3. Evaluation Results

Table 2 illustrates the ink types and evaluation results used in each example and each comparative example.

TABLE 2

| | | | | | | | | | | Comparative Example | | |
| --- | --- | --- | --- | --- | --- | --- | --- | --- | --- | --- | --- | --- |
| | | Example | | | | | | | | C100% + M100% + K50% | Y100% + C100% + K50% | M100% + Y100% + K50% |
| | | 1 | 2 | 3 | 4 | 5 | 6 | 7 | 8 | | | |
| Amount of ink ejection | | 100% | 100% | 100% | 100% | 100% | 100% | 100% | 100% | 250% | 250% | 250% |

TABLE 2-continued

Evaluation results

| | | Example | | | | | | | | Comparative Example | | |
| --- | --- | --- | --- | --- | --- | --- | --- | --- | --- | --- | --- | --- |
| | | | | | | | | | | C100% + M100% + K50% | Y100% + C100% + K50% | M100% + Y100% + K50% |
| | | 1 | 2 | 3 | 4 | 5 | 6 | 7 | 8 | | | |
| Evaluation | Hue angle ∠H° | 299 | 297 | 309 | 307 | 178 | 176 | 10 | 11 | 301 | 167 | 19 |
| | Lightness L* | 24 | 21 | 15 | 15 | 25 | 26 | 25 | 22 | 15 | 18 | 22 |
| | Abrasion resistance | A | A | A | A | A | A | A | A | B | B | B |
| | Bleeding | A | A | A | A | A | A | A | A | C | C | C |
| | Transfer unevenness | A | A | A | A | A | A | A | A | C | C | C |
| | Set-off property | A | A | A | A | A | A | A | A | C | C | C |

From the above evaluation results, the following was found.

(1) The inks of Examples 1 to 4 (first ink) could have a hue angle ∠H° in the range of 295° or more and 310° or less and the lightness L* in the range of 5 or more and 25 or less even when the ink was used alone.

In addition, the inks of Examples 5 to 6 (second ink) could have a hue angle ∠H° in the range of 130° or more and 180° or less and the lightness L* in the range of 15 or more and 30 or less even when the ink was used alone.

Furthermore, the inks of Examples 7 and 8 (third ink) could have a hue angle ∠H° in the range of 0° or more and 45° or less and the lightness L* in the range of 15 or more and 30 or less even when the ink was used alone.

From these facts, it was found that the ink set of the example can easily express a color having a hue angle ∠H° in the range of 295° or more and 310° or less and a lightness L* in the range of 5 or more and 25 or less, a color having a hue angle ∠H° in the range of 130° or more and 180° or less and a lightness L* in the range of 15 or more and 30 or less, and a color having a hue angle ∠H° in the range of 0° or more and 45° or less and a lightness L* in the range of 15 or more and 30 or less with a single ink, respectively. It was found that the dark color as described above can be expressed by a single ink, so that when printing a chromatic color image having low lightness, the amount of ink ejection can be reduced as compared with the case where only the process color is used.

Therefore, it was found that the textile printed material of each example was excellent in the abrasion resistance, the bleeding, the transfer unevenness, and the set-off property.

(2) On the other hand, in the comparative example in which the specific color ink was not used, it was found that it was necessary to mix colors of ink when expressing the color having a hue angle ∠H° in the range of 295° or more and 310° or less and a lightness L* in the range of 5 or more and 25 or less, the color having a hue angle ∠H° in the range of 130° or more and 180° or less and a lightness L* in the range of 15 or more and 30 or less, and the color having a hue angle ∠H° in the range of 0° or more and 45° or less and a lightness L* in the range of 15 or more and 30 or less. That is, when printing a chromatic color image having low lightness, the amount of ink ejection is larger than that in the case where the ink of the example is not used. Therefore, the printed matters of each comparative example were inferior in the abrasion resistance, the bleeding, the transfer unevenness, and the set-off property.

The following contents are derived from the above-described embodiment.

An aspect of the ink jet ink set for textile printing includes a cyan ink, a magenta ink, a yellow ink, a black ink, and one or more selected from a first ink, a second ink, and a third ink, in which all inks constituting the ink jet ink set for textile printing contain a sublimation dye, respectively, the first ink has, on a textile printed material after textile printing, a hue angle ∠H° defined in a CIELAB color space in a range of 295° or more and 310° or less, and a lightness L* defined in a CIELAB color space in a range of 5 or more and 25 or less, the second ink has, on a textile printed material after textile printing, a hue angle ∠H° defined in a CIELAB color space in a range of 130° or more and 180° or less, and a lightness L* defined in a CIELAB color space in a range of 15 or more and 30 or less, and the third ink has, on a textile printed material after textile printing, a hue angle ∠H° defined in a CIELAB color space in a range of 0° or more and 45° or less, and a lightness L* defined in a CIELAB color space in a range of 15 or more and 30 or less.

In an aspect of the ink jet ink set for textile printing, as the sublimation dye, the first ink may contain one or more selected from C. I. Disperse Blue 72, C. I. Disperse Blue 359, C. I. Disperse Blue 360, C. I. Solvent Violet 13, and C. I. Disperse Violet 28, and one or more selected from C. I. Disperse Yellow 54, C. I. Disperse Yellow 232, C. I. Solvent Yellow 145, C. I. Disperse Orange 25, C. I. Solvent Orange 60, and C. I. Disperse Brown 27.

In any aspect of the ink jet ink set for textile printing, a total content of the sublimation dye contained in the first ink may be 3% by mass or more and 8% by mass or less with respect to a total mass of the first ink.

In any aspect of the ink jet ink set for textile printing, as the sublimation dye, the second ink may contain one or more selected from C. I. Disperse Blue 72, C. I. Disperse Blue 359, C. I. Disperse Blue 360, C. I. Solvent Violet 13, and C. I. Disperse Violet 28, and one or more selected from C. I. Disperse Yellow 54, C. I. Disperse Yellow 232, and C. I. Solvent Yellow 145.

In any aspect of the ink jet ink set for textile printing, a total content of the sublimation dye contained in the second ink may be 3% by mass or more and 10% by mass or less with respect to a total mass of the second ink.

In any aspect of the ink jet ink set for textile printing, as the sublimation dye, the third ink may contain one or more selected from C. I. Disperse Blue 72, C. I. Disperse Blue 359, C. I. Disperse Blue 360, C. I. Solvent Violet 13, and C. I. Disperse Violet 28, and one or more selected from C. I. Disperse Red 60, C. I. Disperse Red 154, C. I. Disperse Red 191, C. I. Disperse Brown 27, C. I. Disperse Orange 25, and C. I. Solvent Orange 60.

In any aspect of the ink jet ink set for textile printing, a total content of the sublimation dye contained in the third ink may be 3% by mass or more and 10% by mass or less with respect to a total mass of the third ink.

In any aspect of the ink jet ink set for textile printing, all the inks constituting the ink jet ink set for textile printing may contain an anionic dispersant, glycerin, glycols, and a surfactant.

In any aspect of the ink jet ink set for textile printing, the anionic dispersant may be a naphthalene sulfonic acid condensate or a sodium lignin sulfonate.

In any aspect of the ink jet ink set for textile printing, the surfactant may be one or more selected from an acetylene glycol-based surfactant and a silicon-based surfactant.

In any aspect of the ink jet ink set for textile printing, a content of the surfactant may be in a range of 0.1% by mass or more and 2.0% by mass or less with respect to a total mass of the ink.

An aspect of the ink jet recording method includes ejecting the above-described ink jet ink set for textile printing by an ink jet method and performing recording on a recording target medium.

An aspect of an ink jet recording apparatus includes an ink container each containing the ink constituting the above-described ink jet ink set for textile printing.

In an aspect of the ink jet recording apparatus, the ink container may include an ink pour for replenishing an ink, and an ink container containing the first ink and an ink container containing the black ink may be disposed at positions adjacent to each other.

In any aspect of the ink jet recording apparatus, the ink container may include an ink pour for replenishing an ink, and an ink container containing the first ink and an ink container containing the cyan ink may be disposed at positions adjacent to each other.

In any aspect of the ink jet recording apparatus, the ink container may include an ink pour for replenishing an ink, and an ink container containing the first ink and an ink container containing the yellow ink may be disposed at positions adjacent to each other.

In any aspect of the ink jet recording apparatus, the ink container may include an ink pour for replenishing an ink, and an ink container containing the first ink and an ink container containing the magenta ink may be disposed at positions not adjacent to each other.

In any aspect of the ink jet recording apparatus, the ink container may include an ink pour for replenishing an ink, and an ink container containing the second ink and an ink container containing the black ink may be disposed at positions adjacent to each other.

In any aspect of the ink jet recording apparatus, the ink container may include an ink pour for replenishing an ink, and an ink container containing the second ink and an ink container containing the cyan ink may be disposed at positions adjacent to each other.

In any aspect of the ink jet recording apparatus, the ink container may include an ink pour for replenishing an ink, and an ink container containing the second ink and an ink container containing the yellow ink may be disposed at positions adjacent to each other.

In any aspect of the ink jet recording apparatus, the ink container may include an ink pour for replenishing an ink, and an ink container containing the second ink and an ink container containing the magenta ink may be disposed at positions not adjacent to each other.

In any aspect of the ink jet recording apparatus, the ink container may include an ink pour for replenishing an ink, and an ink container containing the third ink and an ink container containing the black ink may be disposed at positions adjacent to each other.

In any aspect of the ink jet recording apparatus, the ink container may include an ink pour for replenishing an ink, and an ink container containing the third ink and an ink container containing the cyan ink may be disposed at positions adjacent to each other.

In any aspect of the ink jet recording apparatus, the ink container may include an ink pour for replenishing an ink, and an ink container containing the third ink and an ink container containing the magenta ink may be disposed at positions adjacent to each other.

In any aspect of the ink jet recording apparatus, the ink container may include an ink pour for replenishing an ink, and an ink container containing the third ink and an ink container containing the yellow ink may be disposed at positions not adjacent to each other.

In any aspect of the ink jet recording apparatus, the ink container may include an ink pour for replenishing an ink, and an ink container containing the first ink and an ink container containing the black ink may be disposed at positions not adjacent to each other.

In any aspect of the ink jet recording apparatus, the ink container may include an ink pour for replenishing an ink, and an ink container containing the second ink and an ink container containing the black ink may be disposed at positions not adjacent to each other.

In any aspect of the ink jet recording apparatus, the ink container may include an ink pour for replenishing an ink, and an ink container containing the third ink and an ink container containing the black ink may be disposed at positions not adjacent to each other.

The present disclosure is not limited to the above-described embodiment, and various modifications are possible. For example, the present disclosure includes a configuration substantially the same as the configuration described in the embodiment (for example, a configuration having the same function, method, and result, or a configuration having the same purpose and effect). In addition, the present disclosure also includes a configuration in which a non-essential part of the configuration described in the embodiment is replaced. In addition, the present disclosure also includes a configuration that exhibits the same effects as the configuration described in the embodiment or a configuration that can achieve the same object. In addition, the present disclosure also includes a configuration in which a known technique is added to the configuration described in the embodiment.

What is claimed is:

1. An ink jet ink set for textile printing comprising a cyan ink, a magenta ink, a yellow ink, a black ink, and one or more selected from a first ink, a second ink, and a third ink, wherein
    all inks constituting the ink jet ink set for textile printing contain a sublimation dye, respectively,
    the first ink has, on a textile printed material after textile printing, a hue angle $\angle H°$ defined in a CIELAB color space in a range of 295° or more and 310° or less, and a lightness $L^*$ defined in a CIELAB color space in a range of 5 or more and 25 or less,
    the second ink has, on a textile printed material after textile printing, a hue angle $\angle H°$ defined in a CIELAB color space in a range of 130° or more and 180° or less, and a lightness $L^*$ defined in a CIELAB color space in a range of 15 or more and 30 or less,
    the third ink has, on a textile printed material after textile printing, a hue angle $\angle H°$ defined in a CIELAB color space in a range of 0° or more and 45° or less, and a lightness L* defined in a CIELAB color space in a range of 15 or more and 30 or less, as the sublimation dye, the first ink contains C. I. Solvent Violet 13 and a water-soluable organic solvent, the water-soluble organic solvent includes glycerin, and a content of the water-soluble organic solvent is 20% by mass or more.

2. The ink jet ink set for textile printing according to claim 1, wherein as the sublimation dye, the first ink contains one or more selected from C. I. Disperse Yellow 54, C. I. Disperse Yellow 232, C. I. Solvent Yellow 145, C. I. Disperse Orange 25, C. I. Solvent Orange 60, and C. I. Disperse Brown 27.

3. The ink jet ink set for textile printing according to claim 1, wherein a total content of the sublimation dye contained in the first ink is 3% by mass or more and 8% by mass or less with respect to a total mass of the first ink.

4. The ink jet ink set for textile printing according to claim 1, wherein as the sublimation dye, the second ink contains one or more selected from C. I. Disperse Blue 72, C. I. Disperse Blue 359, C. I. Disperse Blue 360, C. I. Solvent Violet 13, and C. I. Disperse Violet 28, and one or more selected from C. I. Disperse Yellow 54, C. I. Disperse Yellow 232, and C. I. Solvent Yellow 145.

5. The ink jet ink set for textile printing according to claim 1, wherein a total content of the sublimation dye contained in the second ink is 3% by mass or more and 10% by mass or less with respect to a total mass of the second ink.

6. The ink jet ink set for textile printing according to claim 1, wherein as the sublimation dye, the third ink contains one or more selected from C. I. Disperse Blue 72, C. I. Disperse Blue 359, C. I. Disperse Blue 360, C. I. Solvent Violet 13, and C. I. Disperse Violet 28, and one or more selected from C. I. Disperse Red 60, C. I. Disperse Red 154, C. I. Disperse Red 191, C. I. Disperse Brown 27, C. I. Disperse Orange 25, and C. I. Solvent Orange 60.

7. The ink jet ink set for textile printing according to claim 1, wherein a total content of the sublimation dye contained in the third ink is 3% by mass or more and 10% by mass or less with respect to a total mass of the third ink.

8. The ink jet ink set for textile printing according to claim 1, wherein all the inks constituting the ink jet ink set for textile printing contain an anionic dispersant, glycerin, glycols, and a surfactant.

9. The ink jet ink set for textile printing according to claim 8, wherein the anionic dispersant is a naphthalene sulfonic acid condensate or a sodium lignin sulfonate.

10. The ink jet ink set for textile printing according to claim 8, wherein the surfactant is one or more selected from an acetylene glycol-based surfactant and a silicon-based surfactant.

11. The ink jet ink set for textile printing according to claim 8, wherein a content of the surfactant is in a range of 0.1% by mass or more and 2.0% by mass or less with respect to a total mass of the ink.

12. An ink jet recording method comprising ejecting the ink jet ink set for textile printing according to claim 1 by an ink jet method and performing recording on a recording target medium.

13. An ink jet recording apparatus comprising an ink container each containing the ink constituting the ink jet ink set for textile printing according to claim 1.

14. The ink jet recording apparatus according to claim 13, wherein the ink container includes an ink pour for replenishing an ink, and an ink container containing the first ink and an ink container containing the black ink are disposed at positions adjacent to each other.

15. The ink jet recording apparatus according to claim 13, wherein the ink container includes an ink pour for replenishing an ink, and an ink container containing the first ink and an ink container containing the magenta ink are disposed at positions not adjacent to each other.

16. The ink jet recording apparatus according to claim 13, wherein the ink container includes an ink pour for replenishing an ink, and an ink container containing the second ink and an ink container containing the black ink are disposed at positions adjacent to each other.

17. The ink jet recording apparatus according to claim 13, wherein the ink container includes an ink pour for replenishing an ink, and an ink container containing the second ink and an ink container containing the magenta ink are disposed at positions not adjacent to each other.

18. The ink jet recording apparatus according to claim 13, wherein the ink container includes an ink pour for replenishing an ink, and an ink container containing the third ink and an ink container containing the black ink are disposed at positions adjacent to each other.

19. The ink jet recording apparatus according to claim 13, wherein the ink container includes an ink pour for replenishing an ink, and an ink container containing the third ink and an ink container containing the yellow ink are disposed at positions not adjacent to each other.

20. An ink jet ink set for textile printing comprising a cyan ink, a magenta ink, a yellow ink, a black ink, and one or more selected from a first ink, a second ink, and a third ink, wherein all inks constituting the ink jet ink set for textile printing contain a sublimation dye, respectively, the first ink has, on a textile printed material after textile printing, a hue angle $\angle H°$ defined in a CIELAB color space in a range of 295° or more and 310° or less, and a lightness L* defined in a CIELAB color space in a range of 5 or more and 25 or less, the second ink has, on a textile printed material after textile printing, a hue angle $\angle H°$ defined in a CIELAB color space in a range of 130° or more and 180° or less, and a lightness L* defined in a CIELAB color space in a range of 15 or more and 30 or less, the third ink has, on a textile printed material after textile printing, a hue angle $\angle H°$ defined in a CIELAB color space in a range of 0° or more and 45° or less, and a lightness L* defined in a CIELAB color space in a range of 15 or more and 30 or less, as the sublimation dye, the first ink contains C. I. Solvent Violet 13, all the inks constituting the ink jet ink set for textile printing contain an anionic dispersant, glycerin, glycols, and a surfactant, and the glycols include methyl triglycol.

* * * * *